July 25, 1950 R. FISCHER 2,516,456
CONTROL ATTACHMENT FOR WEIGHING MACHINES
Filed Aug. 12, 1948 2 Sheets-Sheet 1

INVENTOR.
RAYMOND FISCHER
BY
*Z. T. Wobensmith 2nd*
ATTORNEY.

July 25, 1950 R. FISCHER 2,516,456
CONTROL ATTACHMENT FOR WEIGHING MACHINES
Filed Aug. 12, 1948 2 Sheets-Sheet 2
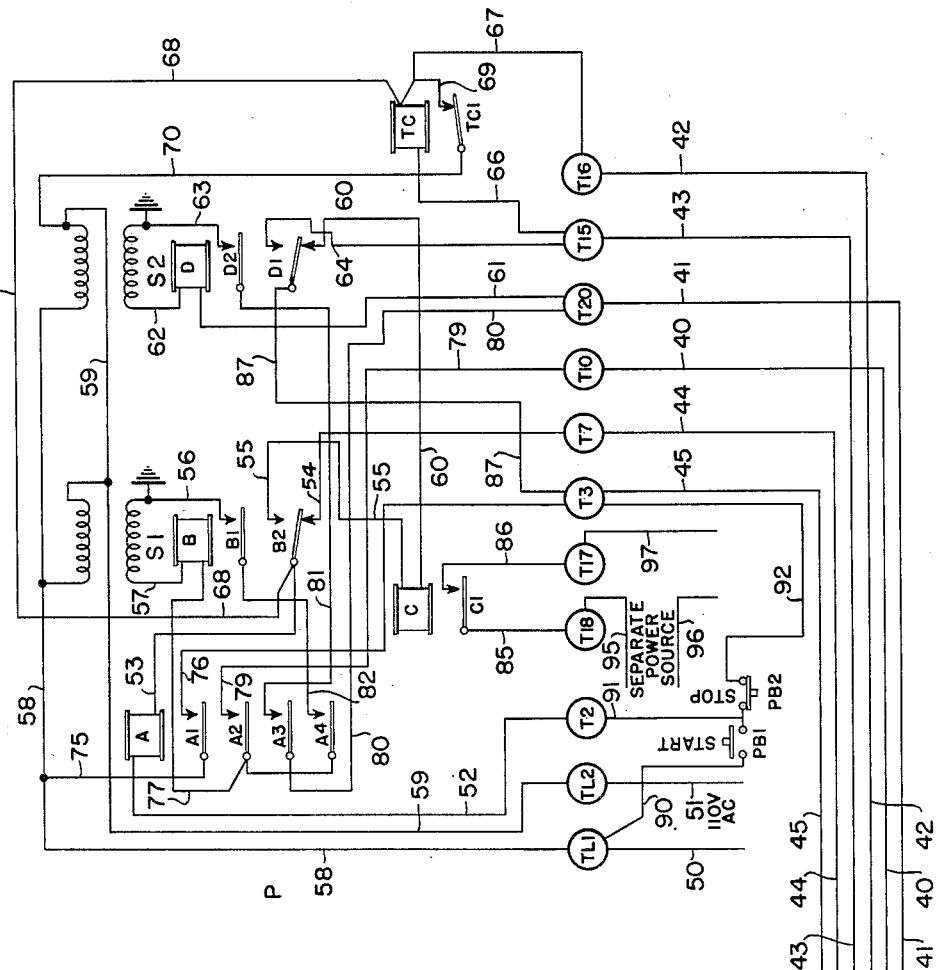
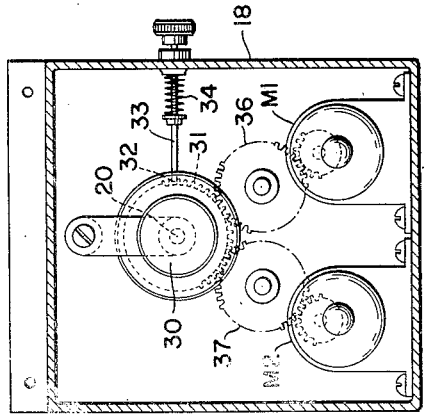
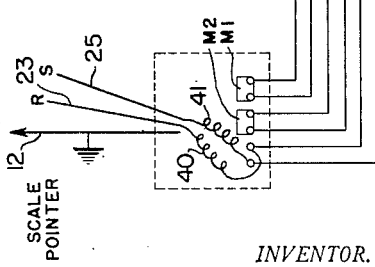
*INVENTOR.*
RAYMOND FISCHER
BY
J. T. Wobensmith
ATTORNEY.

Patented July 25, 1950

2,516,456

UNITED STATES PATENT OFFICE 2,516,456

CONTROL ATTACHMENT FOR WEIGHING MACHINES

Raymond Fischer, Drexel Hill, Pa.

Application August 12, 1948, Serial No. 43,795

1 Claim. (Cl. 249—2)

This invention relates to control attachments for weighing scales and more particularly to an attachment for use with circular dial type scales now in use or for inclusion in such scales at the time of manufacture.

It is the principal object of the present invention to provide control apparatus for use with weighing scales which may be employed in controlling automatic operations in connection with weighing.

It is a further object of the present invention to provide a control attachment for weighing scales having provisions for accommodation of an unknown tare weight and with additional provisions for indicating or controlling weighing operations.

It is a further object of the present invention to provide a weighing machine attachment for control purposes which is suitable for use with existing scales and with which only relatively minor changes are required in the scales for installation.

It is a further object of the present invention to provide an attachment which is particularly useful with weighing scales for automatically placing a predetermined weight of material in a container.

It is a further object of the present invention to provide an attachment for weighing scales which is particularly useful for compensating for the difference in the tare weights of various containers when placing a predetermined amount of material in the containers.

It is a further object of the present invention to provide an attachment for weighing scales which is particularly useful for balancing off the tare weight of an empty container on a weighing scale.

It is a further object of the present invention to provide an attachment for weighing scales which utilizes a variable positioned contact arm for making an electrical contact with a corresponding contact on the pointer of the scale.

Other objects and advantageous features of the application will be apparent from the specification and claim.

The nature and characteristic features of the invention will be more readily understood from the following description, taken in connection with the accompanying drawings forming part hereof, in which:

Fig. 3 is a vertical sectional view taken approximately on the line 3—3 of Fig. 2; and Fig. 4 is a diagrammatic view of a circuit arrangement which may be employed in connection with the apparatus of the present invention.

Figure 2:
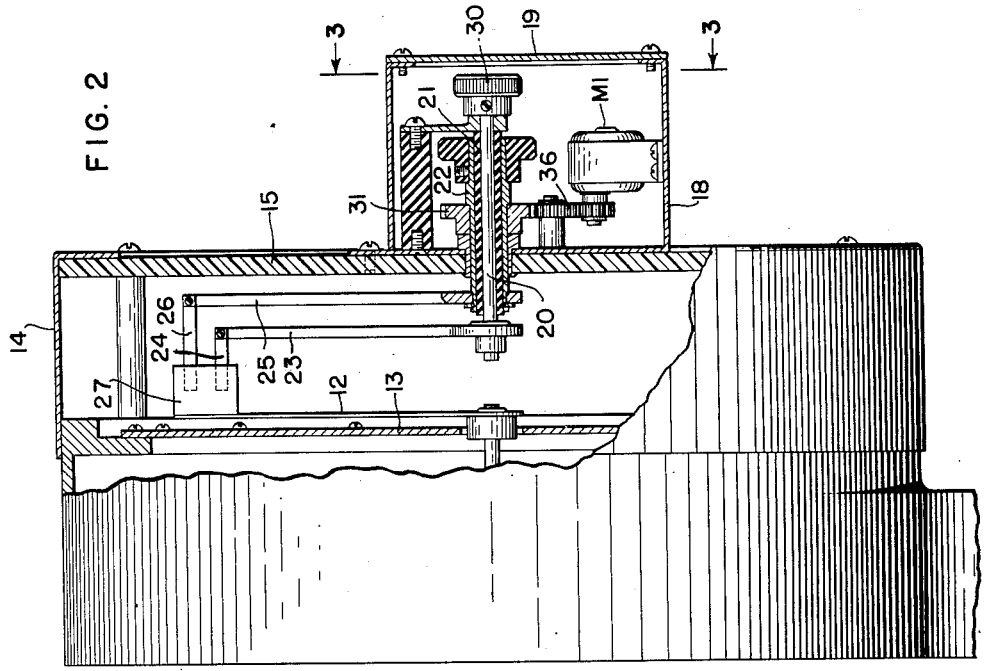
Fig. 2 is a vertical sectional view taken approximately on the line 2—2 of Fig. 1.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, a weighing scale of the conventional type is illustrated at 10 and includes a weighing platform 11, adapted for the reception of the object or material to be weighed, mechanically or otherwise connected to a movable scale pointer 12. The scale pointer 12 is movable with respect to a graduated scale 13 of the dial type for visual indication of the weight indicating positions of the scale pointer 12. In scales of this type the scale dial 13 is provided customarily with a transparent front cover plate which may be utilized, if there is sufficient clearance between the cover and the scale dial 13. If there is insufficient clearance, a housing 14 may be provided extending forwardly from the dial 13 in which a transparent front cover plate 15 is mounted. The front cover plate 15 may be of glass, transparent synthetic plastic or the like through which the dial 13 and scale pointer 12 are visible. The front cover plate 15 is of a material which is electrically non-conducting.

The control attachment in accordance with the present invention preferably includes a casing portion 18, attached to the front cover plate 15 and having a removable front wall 19. Within the casing portion 18 a shaft 20 is mounted and extends through the plate 15. The shaft 20 has an insulating sleeve 21 thereon on which a concentric hollow shaft 22 is mounted and extends through the plate 15. The shafts 20 and 22 are preferably in frictional engagement with the sleeve 21 so that they normally move together but may be shifted angularly with respect to each other if desired and as hereinafter explained.

The shaft 20 has secured thereto, for movement therewith, an indicator and contact arm 23 at the outer end of which an electrical contact 24 is provided. The shaft 22 also has an indicator and contact arm 25 connected thereto, for movement therewith, and is also provided with an electrical contact 26 at the outer end thereof. The scale pointer 12 is also provided with an electrical contact 27 for engagement with the contact 24 and with the contact 26, as hereinafter explained.

The shaft 20 extends forwardly in the casing 18 and is provided with a knob 30 for manual adjustment or resetting. The shaft 22 is provided with a gear 31 for engagement by a tongue 32. The tongue 32 is carried on a pin 33 which is normally held in retracted position by a spring 34 and is accessible from the exterior of the casing 18. By manual movement inwardly of the pin 33, against the force of the spring 34 the tongue 32 is engaged with the gear 31, the shaft 22 is held against rotation and the shaft 20 may be turned with respect thereto by the knob 30. The angular position of the arms 23 and 25 may thus be adjusted as desired.

The shaft 22 has the gear 31 mounted thereon which is connected by a gear 36 to the shaft of an electric motor M1, rotatable in a predetermined direction, for adjustably positioning the pointer arms 23 and 25 at the desired weight indications on the dial 13, and by a gear 37 to the shaft of an electric motor M2, rotatable in the opposite direction to that of the motor M1 for moving the pointer arms 23 and 25 from the positions determined by the motor M1. The motors M1 and M2 may be combined in a single housing and with a single reversible shaft if desired.

The scale pointer 12 is preferably connected to ground by grounding the frame of the scale 10. The indicator arm 23 preferably has an electrical conductor 40 connected thereto, the indicator arm 25 has a conductor 41 connected thereto and power leads 42, 43, 44, and 45 are respectively provided for the motors M2 and M1. The conductors 40 to 45, inclusive extend respectively to terminals T10, T20, T16, T15, T7 and T3, at a suitable panel P.

Referring now more particularly to Fig. 4 of the drawings, on which one typical arrangement of circuit connections for use with the control attachment is illustrated, conductors 50 and 51 are provided, connected to terminals TL1 and TL2, respectively and to a suitable source of electrical energy, such as a 110 volt alternating current supply.

A control relay A is provided at the panel P, of any preferred type, and as illustrated has a winding and a plurality of movable contact arms A1, A2, A3, and A4, all of which are normally in open circuit position when the winding is deenergized. The winding of the relay A has one terminal thereof connected by a conductor 52 to a terminal T2 on the panel P and the other terminal of the winding of the relay A is connected by a conductor 53 to a movable contact arm B2 of a relay B.

The contact arm B2 of the relay B is adapted for engagement with a back contact connected to a conductor 54, when the winding of the relay B is deenergized, and for engagement with a front contact connected to a conductor 55 upon energization of the winding of the relay B. The conductor 54 extends to the terminal T7 on the panel B. The relay B is also provided with a contact arm B1 adapted for engagement with a contact connected to a conductor 56 upon energization of the relay B. One terminal of the winding of the relay B is connected by a conductor 57 to one terminal of the secondary winding of a transformer S1. The other terminal of the secondary winding of the transformer S1 is connected to ground and to the conductor 56. The primary winding of the transformer S1 is preferably shunted between a conductor 58 connected to the power lead terminal TL1 and a conductor 59 connected to the power lead terminal TL2.

A fluent material feed control relay C may be provided having a winding, one terminal of which is connected to the conductor 55 and the other terminal of which is connected by a conductor 60 to a contact of a relay D for engagement by a movable contact arm D1 when the relay D is deenergized.

The relay D has a winding, one terminal of which is connected by a conductor 61 to the terminal T20 at the panel P and the other terminal of which is connected by a conductor 62 to a terminal of a secondary winding of a transformer S2. The other terminal of the secondary winding is connected to ground and by a conductor 63 to a contact which is adapted for engagement by a movable contact arm D2 when the winding of the relay D is energized.

The primary winding of the transformer S2 is connected to the conductor 59 and to the conductor 58. The contact arm D1 of the relay D is adapted for engagement, when the winding of the relay D is deenergized, with the contact to which the conductor 60 is connected and when the winding of the relay D is energized, with a contact to which a conductor 64 is connected. The conductor 64 extends to the terminal T15.

A timer control relay TC is provided, preferably adjustable as to the time which elapses before energization of its winding is effective, and has a winding one terminal of which is connected by a conductor 66 to the terminal T15, and the other terminal of which is connected by a conductor 67 to the terminal T16. The conductor 68 is connected to the conductor 53 at the contact arm B2, and by a conductor 69 to a contact for engagement by a contact arm TC1 of the relay TC. The contact arm TC1 is connected by a conductor 70 to the conductor 59.

The contact arm A1 is connected by a conductor 75 to the conductor 58 and is adapted for engagement when the winding of the relay A is energized with a contact which is connected by a conductor 76 to the terminal T3. The contact arm A2 is connected by a conductor 77 to the opposite terminal of the winding of the relay B to that to which the conductor 57 is connected, and is connected by a conductor 78 to the contact arm A4. The contact arm A2 is adapted for engagement with a contact connected by a conductor 79 to the terminal T10. The contact arm A3 is connected by a conductor 80 to the terminal T20. The contact arm A3 is adapted for engagement with a contact connected by a conductor 81 to the contact arm D2 of the relay D.

The contact arm A4 is adapted for engagement with a contact connected by a conductor 82 to the contact arm B1 of the relay B.

The relay C has a contact arm C1 connected by a conductor 85 to a terminal T18 on the panel C. The contact arm C1 is adapted for engagement with a contact connected by a conductor 86 to a terminal T18 on the panel P.

The contact arm D1 of the relay D is connected by a conductor 87 to the terminal T3.

The terminal TL1 is adapted to be connected by a conductor 90 to a starting push button PB1 which is adapted to be momentarily pushed to establish a connection with a conductor 91 connected to the terminal T2. A stop push button PB2 is also provided which is adapted to establish a connection between the conductor 91 and a conductor 92 which is connected to the terminal T3. The starting push button PB1 and the stop push button PB2 may be located at any desired location for easy access by the operator.

Figure 1:
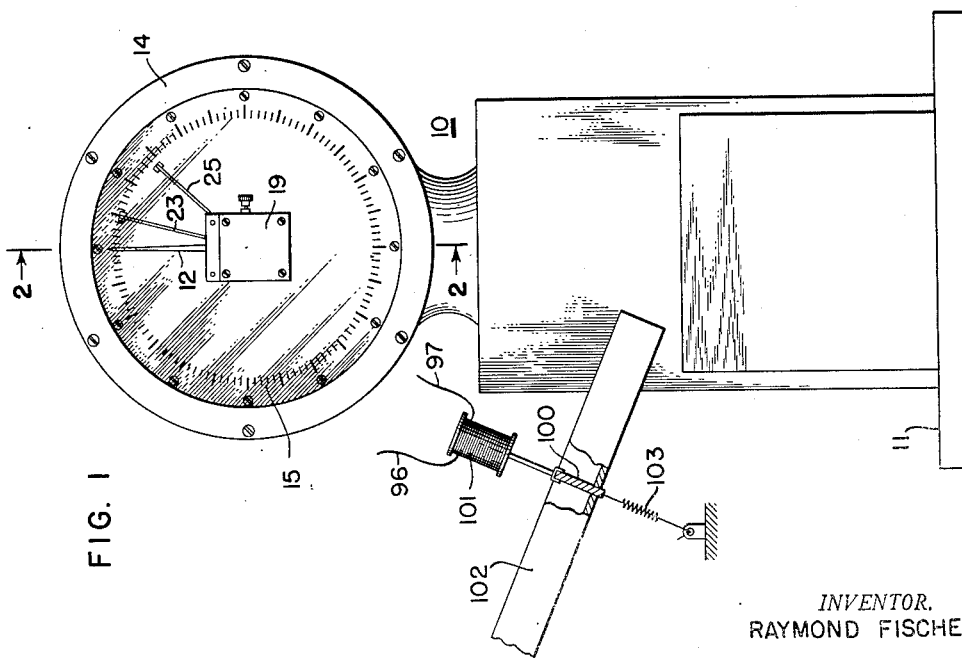
Figure 1 is a view, partly diagrammatic, showing a weighing scale having mounted thereon apparatus in accordance with the present invention.

The terminals T17 and T18 may be utilized for the connection of indicating or controlling apparatus, if desired, and, where feed control apparatus with automatic control of the feed is desired, a separate power source may be connected by conductors 95 and 96, with the conductor 95 connected to the terminal T18, and with conductor 96 connected through solenoid 101 (Fig. 1), and a conductor 97 connected to the terminal T17, leading to the feed control apparatus FC.

The feed controller may be of any desired type and is illustrated diagrammatically as a feed valve 100 controlled by a solenoid 101 and interposed in a fluent material feed line 102. The valve 100 may be urged to closed position by a spring 103 so that, upon energization of the solenoid 101 feeding is permitted, and upon de-energization, is discontinued or cut off.

The mode of operation will now be pointed out.

The operator adjusts the angular position between the indicator arms 23 and 25 as shown on the scale dial 13 in accordance with the desired weight of material to be delivered to the container. This may be effected as heretofore indicated. The arms 23 and 25 are also preferably initially positioned by turning the knob 30 so that the arm 23 is beyond and will not be contacted by the pointer 12 when an empty container is placed on the scale platform 11 and causes movement of the pointer 12.

The operator then places an empty container upon the scale platform 11, and the pointer 12 moves and balances the tare weight. The operator then momentarily pushes the starting pushbutton PB1. The motor M1 is energized, by circuits set up as hereinafter explained, and simultaneously advances the arms 23 and 25 until the arm 23 is brought to a position so that its contact 24 engages the contact 27 on the pointer 12. The operation of the motor M1 is discontinued and feeding of fluent material to the container is initiated circuits being provided for this purpose as hereinafter explained.

As feeding continues the pointer 12 moves to a position so that its contact 27 engages with the contact 26 of the arm 25. Feeding of fluent material is terminated and operation of the motor M2 is effected in a reverse direction to that of the motor M1 to reposition the arms 23 and 25 at their positions prior to movement of the pushbutton PB1. Operation of the motor M2 is automatically discontinued.

The cycle may be repeated as often as desired and with different tare weights.

If for any reason during the cycle of operations just described it is desired to stop, actuation of the stop button PB2 will cause an immediate discontinuance. The arms 23 and 25 are then manually reset to their initial positions and the cycle may again be initiated by actuation of the starting button PB1.

The manner in which this is accomplished will now be pointed out.

When the starting pushbutton PB1 is momentarily pressed a circuit is established for energizing the winding of the relay A which may be traced as follows:

From the terminal TL1, through conductor 90, closed contacts of PB1, conductor 91, conductor 52, winding of relay A, conductor 53, conductor 68, closed contacts of TC1, conductor 70 and conductor 59 to terminal TL2.

At the same time a temporary circuit is established to energize the motor M1 which may be traced as follows:

From the terminal TL1, through conductor 90, closed contacts of PB1, closed contacts of PB2, conductor 92, conductor 45, motor M1, conductor 44, conductor 54, contact arm B2, conductor 68, conductor 69, contact arm TC1, conductor 70 and conductor 59 to terminal TL2.

Upon the energization of the winding of the relay A, a circuit is set up through the contact arm A1 to maintain the winding energized and continue the operation of the motor M1 after the release of the pushbutton PB1. This circuit may be traced as follows:

From the terminal TL1, through conductor 58, conductor 75, contact arm A1, conductor 76, conductor 92, closed contacts of PB2, conductor 91, conductor 52, winding of relay A, and thence to terminal TL2, as previously pointed out.

Upon the energization of the winding of the relay A, a circuit is set up through the contact arm A2 for rendering the arm 23 effective and energizing the relay B which may be traced as follows:

From the opposite terminal of the secondary of the transformer S1 to that connected to ground, through conductor 57, winding of relay B, conductor 77, contact arm A2, conductor 79, conductor 40, arm 23, contact 24, contact 27 and arm 12 to ground.

Upon the energization of the winding of the relay B the contact arm B1 is actuated to complete a circuit therethrough and through the contact arm A4 to maintain the winding of the relay B energized upon separation of the contacts 24 and 27.

Upon the energization of the winding of the relay B, a circuit is set up for energizing the winding of the relay C which may be traced as follows:

From the terminal TL1, through conductor 58, conductor 75, contact arm A1, conductor 76, conductor 87, contact arm D1, conductor 60, winding of relay C, conductor 55, contact arm B2, conductor 68, conductor 69, contact arm TC1, conductor 63 and conductor 59 to terminal TL2.

The energization of the winding of the relay C is effective on the contact arm C1 for establishing a circuit through the solenoid 101 to initiate and permit the flow of fluent material into the container.

Upon the engagement of the contacts 24 and 27, also, the energizing circuit for the motor M1 is broken by shifting of the contact arm B2 from its engagement with conductor 54 to engagement with conductor 55.

Upon the energization of the winding of the relay A a circuit is also established through the contact arm A3 for controlling the relay D and rendering the arm 25 effective which may be traced as follows:

From the opposite terminal of the secondary of the transformer S2 to that connected to ground, through conductor 62, winding of relay D, conductor 61, conductor 41, indicator arm 25, and when contact 26 engages contact 27 on arm 12, to ground.

Upon the energization of the winding of relay D, the contact arm D2 is raised to complete a circuit for maintaining the winding energized, and the contact arm is moved to break the circuit through conductor 60 to the winding of the relay C, thus terminating the feed of material to the container, and to establish a circuit for the energization of the motor M2.

This latter circuit may be traced as follows:

From the terminal TL1, through conductor 58, conductor 75, contact arm A1, conductor 76, conductor 87, contact arm D1, conductor 64, conductor 43, motor M2, conductor 42, conductor 67, conductor 69, contact arm TC1, conductor 70, and conductor 59 to terminal TL2.

The relay TC is adjusted to provide the desired time interval of operation, including operation of the motor M2 and upon the expiration of this time period the contact TC1 is opened, thus breaking the operating circuit for the motor M2 and also opening the energizing circuit for the relay A. Upon deenergization of the relay A the relays B and D will likewise be deenergized.

If at any time during the cycle and before completion thereof it is desired to stop, this may be effected by operating the pushbutton PB2. This effects a deenergization of the relay A with immediate termination of the cycle at that part thereof. The indicator arms 23 and 25 may then be reset manually to the position for starting and operations resumed.

I claim:

Weighing apparatus comprising a weighing scale having a weight responsive pointer with an electrical contact, a dial with respect to which said pointer is movable, and a platform for actuating said pointer, control means including a plurality of indicator arms movable with respect to said dial and each having an electrical contact for contact by said pointer contact, mounting means for said arms for positioning said arms at the desired angular relation, motor operated means for said mounting means for positioning said arms with respect to said pointer, means actuated upon engagement of the contact on one of said indicator arms with the pointer contact for initiating feeding of material to be weighed and for discontinuing feeding upon contact of the contact on another of said indicator arms with said pointer contact.

RAYMOND FISCHER.

REFERENCES CITED

The following references are of record in the file of this patent:

UNITED STATES PATENTS

| Number | Name | Date |
|---|---|---|
| Re. 21,169 | McCrery | Aug. 1, 1939 |
| 1,785,370 | Thomas | Dec. 16, 1930 |
| 2,199,010 | Robb | Apr. 30, 1940 |
| 2,303,010 | Walter | Nov. 24, 1942 |